(12) United States Patent
Nakai

(10) Patent No.: US 11,134,175 B2
(45) Date of Patent: Sep. 28, 2021

(54) IMAGE FORMING APPARATUS, METHOD, AND COMPUTER PROGRAM PRODUCT CORRECTING SCANNING DIRECTIONAL POSITIONS OF IMAGE ADJUSTMENT AREAS TO RESTRAIN COLOR REGISTRATION ERROR

(71) Applicant: KYOCERA Document Solutions Inc., Osaka (JP)

(72) Inventor: Jun Nakai, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 16/997,643

(22) Filed: Aug. 19, 2020

(65) Prior Publication Data

US 2021/0067660 A1  Mar. 4, 2021

(30) Foreign Application Priority Data

Aug. 26, 2019 (JP) .............................. JP2019-154027

(51) Int. Cl.
*H04N 1/60* (2006.01)
*H04N 1/00* (2006.01)
(Continued)

(52) U.S. Cl.
CPC .......... *H04N 1/60* (2013.01); *H04N 1/00005* (2013.01); *H04N 1/00015* (2013.01);
(Continued)

(58) Field of Classification Search
CPC .......... H04N 1/00005; H04N 1/00015; H04N 1/00023; H04N 1/00034; H04N 1/00068;
(Continued)

(56) References Cited

U.S. PATENT DOCUMENTS 8,482,793 B2 * 7/2013 Xu ...................... H04N 1/00053
358/1.9
8,902,463 B2 * 12/2014 Shukuya .................. G06K 1/00
358/1.5
(Continued)

FOREIGN PATENT DOCUMENTS

JP  2009-027683  2/2009

*Primary Examiner* — Scott A Rogers

(57) ABSTRACT

An image forming apparatus performs a halftone process using plural dither matrices. Generated is calibration data to calculate a color registration error amount corresponding to a primary scanning directional position of an image forming available width. An image area dividing unit determines an image boundary position that is identical to any of matrix boundaries of plural dither matrices arranged in an image forming target area, and divides the image forming target area into plural image adjustment areas using the image boundary position. A correction processing unit corrects secondary scanning directional positions of the plural image adjustment areas, using respective correction amounts calculated with the calibration data. Further, the image area dividing unit determines the image boundary position using a remainder left by dividing in the primary scanning direction the number of pixels of the image adjustment area by the number of pixels of the dither matrix.

6 Claims, 12 Drawing Sheets

(51) Int. Cl.
  *H04N 1/405*     (2006.01)
  *H04N 1/58*      (2006.01)
(52) U.S. Cl.
  CPC ..... *H04N 1/00023* (2013.01); *H04N 1/00068* (2013.01); *H04N 1/00087* (2013.01); *H04N 1/405* (2013.01); *H04N 1/58* (2013.01)
(58) Field of Classification Search
  CPC .......... H04N 1/00082; H04N 1/00087; H04N 1/405–4058; H04N 1/52; H04N 1/00718; H04N 1/3877; H04N 1/3878; H04N 1/58
  See application file for complete search history.

(56) References Cited

U.S. PATENT DOCUMENTS

2007/0103728 A1\* 5/2007 Otani ................... H04N 1/3878
                                                                      358/1.18
2008/0174799 A1 7/2008 Higashiyama et al.

\* cited by examiner

IMAGE FORMING AVAILABLE WIDTH DIVISIONAL STATUS

EXAMPLE OF SCANNING LINE SLANT

DEVIATION AMOUNT OF EACH IMAGE AREA

CORRECTION AMOUNT OF EACH IMAGE AREA

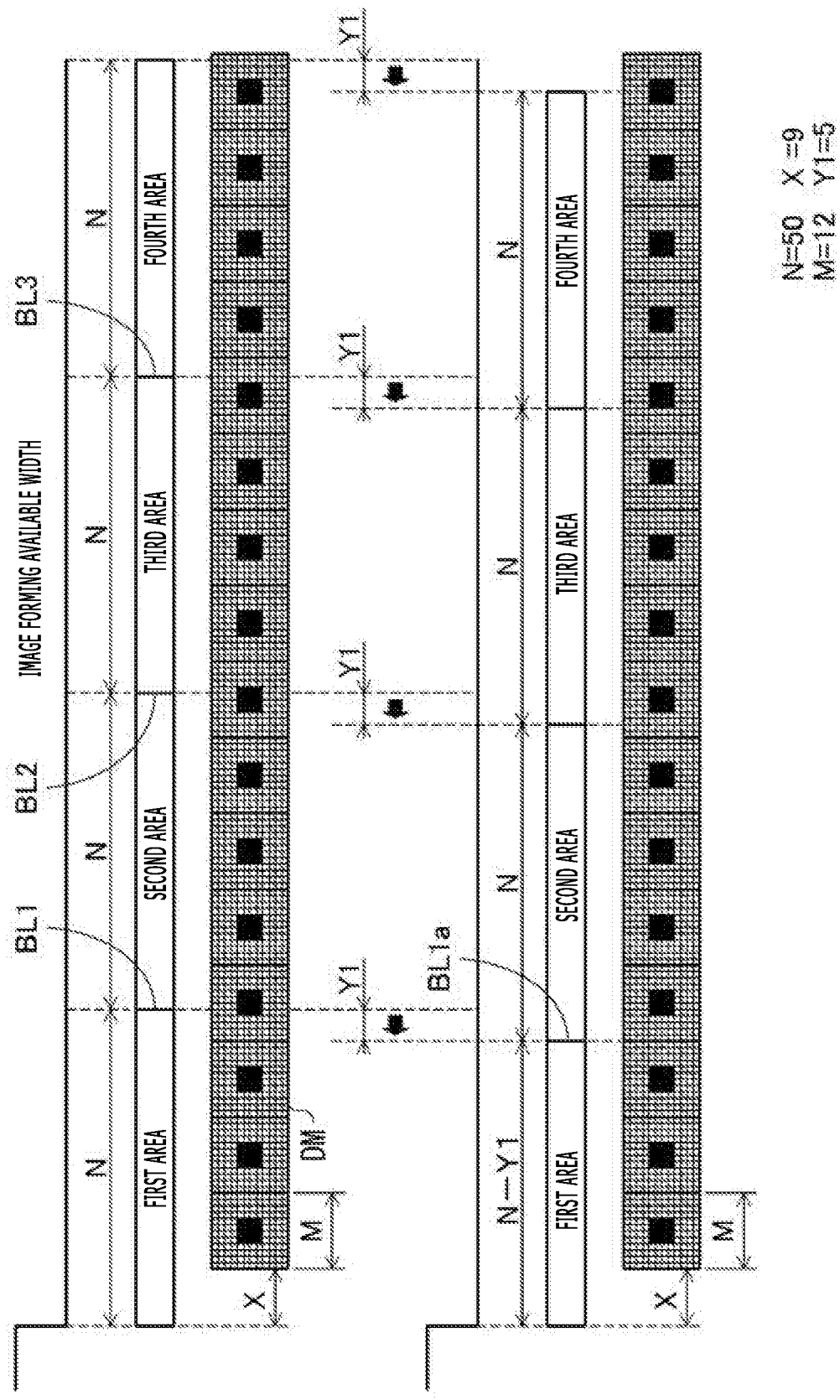

FIG. 9A

START-END-SIDE BOUNDARY DETERMINATION CALCULATION FORMULA $$K_0 = \mathrm{Int}(X/N) + 1 \quad \cdots \mathrm{F1}$$

FIG. 9B

START-END-SIDE BOUNDARY ADJUSTMENT AMOUNT CALCULATION FORMULA

IF $[(N-X) \bmod M] \leq M/2$, THEN $\quad Y = -[(N-X) \bmod M]$

IF $[(N-X) \bmod M] > M/2$, THEN $\quad Y = M - [(N-X) \bmod M] \quad \cdots \mathrm{F2}$

FIG. 9C

BOUNDARY ADJUSTMENT AMOUNT CALCULATION FORMULA

IF $((K-K_0) \times N) \bmod M \leq M/2$, THEN
$\quad \Delta dK = -(((K-K_0) \times N) \bmod M)$ IF $((K-K_0) \times N) \bmod M > M/2$, THEN
$\quad \Delta dK = M - (((K-K_0) \times N) \bmod M) \quad \cdots \mathrm{F3}$

IMAGE FORMING APPARATUS, METHOD, AND COMPUTER PROGRAM PRODUCT CORRECTING SCANNING DIRECTIONAL POSITIONS OF IMAGE ADJUSTMENT AREAS TO RESTRAIN COLOR REGISTRATION ERROR

CROSS-REFERENCE TO RELATED APPLICATIONS

This application relates to and claims priority rights from Japanese Patent Application No. 2019-154027, filed on Aug. 26, 2019, the entire disclosures of which are hereby incorporated by reference herein.

BACKGROUND

1. Field of the Present Disclosure

The present disclosure relates to an image forming apparatus, an image forming method, and a non-transitory computer readable recording medium storing an image forming program.

2. Description of the Related Art

Recently, electrophotographic image forming apparatuses get high image resolution and are enabled to perform image output with a high resolution. It was found that in such an image forming apparatus when a scanning line for scanning on a photoconductor drum gets an even small curvature or slant, the curvature or the slant deteriorated image quality. To solve this problem, applying an adjustment process was proposed that an image forming apparatus divided image data into plural sections in a primary scanning direction, and shifted an image of each section toward a reverse direction to a direction of the curvature or the slant (also called as skew) in a secondary scanning direction and thereby restrained the deterioration of image quality due to the curvature or the slant. However, regarding such an image forming, a process cost of the newly applied adjustment process (e.g. resource required for the adjustment process) is not discussed sufficiently.

SUMMARY

An image forming apparatus that forms an image on an image forming medium on the basis of input image data using colorant of plural colors, according to an aspect of the present disclosure, includes a halftone processing unit, a calibration processing unit, an image area dividing unit, and a correction processing unit. The halftone processing unit is configured to perform a halftone process for the input image data using plural dither matrices. The calibration processing unit is configured to generate calibration data to calculate an amount of a color registration error corresponding to a primary scanning directional position of an image forming available width with regard to an image formed with the colorant of the plural colors. The image area dividing unit is configured to (a) determine (a1) plural matrix boundaries as boundaries of plural dither matrices arranged in an image forming target area in the image forming available width and (a2) an image boundary position that is identical to any of the plural matrix boundaries, and (b) divide the image forming target area with the determined image boundary position in the primary scanning direction and thereby set plural image adjustment areas. The correction processing unit is configured to (a) calculate correction amounts for the plural image adjustment areas using the calibration data in accordance with primary scanning directional positions of the plural image adjustment areas respectively, and (b) correct secondary scanning directional positions of the plural image adjustment areas using the calculated correction amounts respectively and thereby restrain the color registration error. Further, the image area dividing unit determines the image boundary position using a remainder left by dividing the number of pixels consisting of a width of the image adjustment area by the number of pixels in the primary scanning direction of the dither matrix.

An image forming method that forms an image on an image forming medium on the basis of input image data using colorant of plural colors, according to an aspect of the present disclosure, includes a halftone processing step, a calibration processing step, an image area dividing step, and a correction processing step. The halftone processing step performs a halftone process for the input image data using plural dither matrices. The calibration processing step generates calibration data to calculate an amount of a color registration error corresponding to a primary scanning directional position of an image forming available width with regard to an image formed with the colorant of the plural colors. The image area dividing step (a) determines (a1) plural matrix boundaries as boundaries of plural dither matrices arranged in an image forming target area in the image forming available width and (a2) an image boundary position that is identical to any of the plural matrix boundaries, and (b) divides the image forming target area with the determined image boundary position in the primary scanning direction and thereby sets plural image adjustment areas. The correction processing step (a) calculates correction amounts for the plural image adjustment areas using the calibration data in accordance with primary scanning directional positions of the plural image adjustment areas respectively, and (b) corrects secondary scanning directional positions of the plural image adjustment areas using the calculated correction amounts respectively and thereby restrains the color registration error. Further, the image area dividing step includes a step determining the image boundary position using a remainder left by dividing the number of pixels consisting of a width of the image adjustment area by the number of pixels in the primary scanning direction of the dither matrix.

A non-transitory computer readable recording medium according to an aspect of the present disclosure stores an image forming program to control an image forming apparatus that forms an image on an image forming medium on the basis of input image data using colorant of plural colors. The image forming program causes the image forming apparatus to act as the halftone processing unit, the calibration processing unit, the image area dividing unit, and the correction processing unit.

These and other objects, features and advantages of the present disclosure will become more apparent upon reading of the following detailed description along with the accompanied drawings.

BRIEF DESCRIPTION OF THE DRAWINGS

FIG. 8 shows an explanation diagram that indicates an example of a start-end-side boundary position adjustment process;

FIGS. 9A, 9B, and 9C show explanation diagrams that indicate calculation formulas used in a boundary position adjustment process in the embodiment;

DETAILED DESCRIPTION

Hereinafter, an embodiment of the present disclosure will be explained with reference to drawings.

Figure 1:
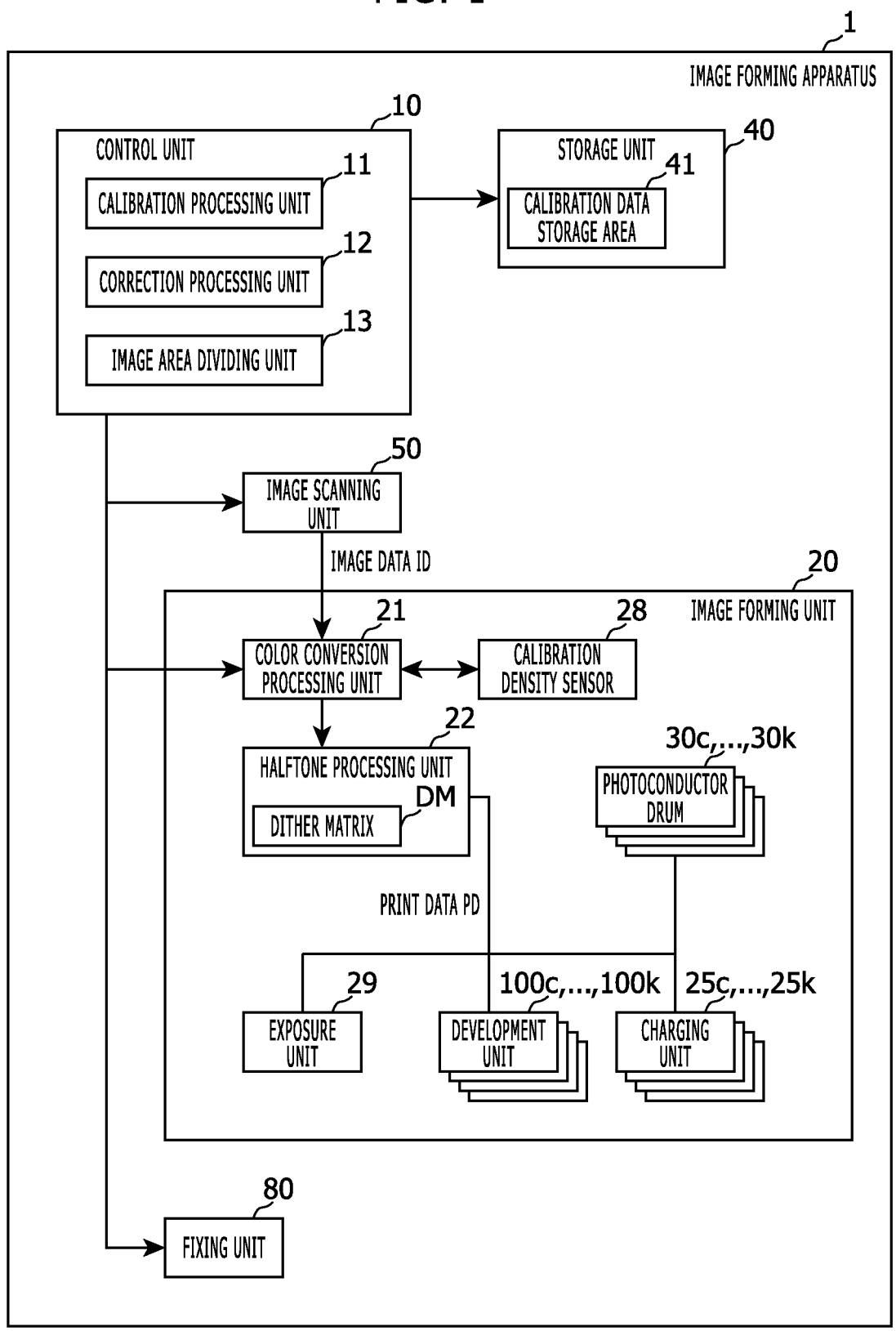
FIG. 1 shows a block diagram that indicates a functional configuration of an image forming apparatus 1 according to an embodiment of the present disclosure.

FIG. 1 shows a block diagram that indicates a functional configuration of an image forming apparatus 1 according to an embodiment of the present disclosure. The image forming apparatus 1 includes a control unit 10, an image forming unit 20, a storage unit 40, an image scanning unit 50, and a fixing unit 80. The image scanning unit 50 scans an image from a document and thereby generates image data ID as RGB digital data.

The image forming unit 20 includes a color conversion processing unit 21, a halftone processing unit 22, a calibration density sensor 28, an exposure unit 29, photoconductor drums (image carriers) 30c to 30k as amorphous silicon photoconductors, development units 100c to 100k, and charging units 25c to 25k. The image forming unit 20 forms an image on an image forming medium on the basis of input image data using colorant (e.g. CMYK toner or ink) of plural colors. The color conversion processing unit 21 performs color conversion of the image data ID as RGB data to CMYK data.

The halftone processing unit 22 include a dither matrix DM. The halftone processing unit 22 performs a halftone process for the CMYK data using the dither matrix DM, and thereby generates print data PD that includes halftone data of CMYK. The halftone data indicates a dot formation status of a dot formed with toner of each color of CMYK, and is also called as dot data.

The control unit 10 includes main memory means such as RAM and ROM, and control means such as MPU (Micro Processing Unit) or CPU (Central Processing Unit). In addition, the control unit 10 has a control function with sorts of interfaces such as I/O, USB (Universal Serial Bus), bus, and/or other hardware, and thereby controls a whole of the image forming apparatus 1. The control 10 unit includes a calibration processing unit 11, a correction processing unit 12, and an image area dividing unit 13. Functions of the calibration processing unit 11, the correction processing unit 12, and the image area dividing unit 13 are mentioned below.

The storage unit 40 is a storage device that includes a non-transitory recording medium such as hard disk drive or flash memory, and in the storage unit 40, a control program and data have been stored for a process to be performed by the control unit 10. In this embodiment, the storage unit 40 includes a calibration data storage area 41.

Figure 2:
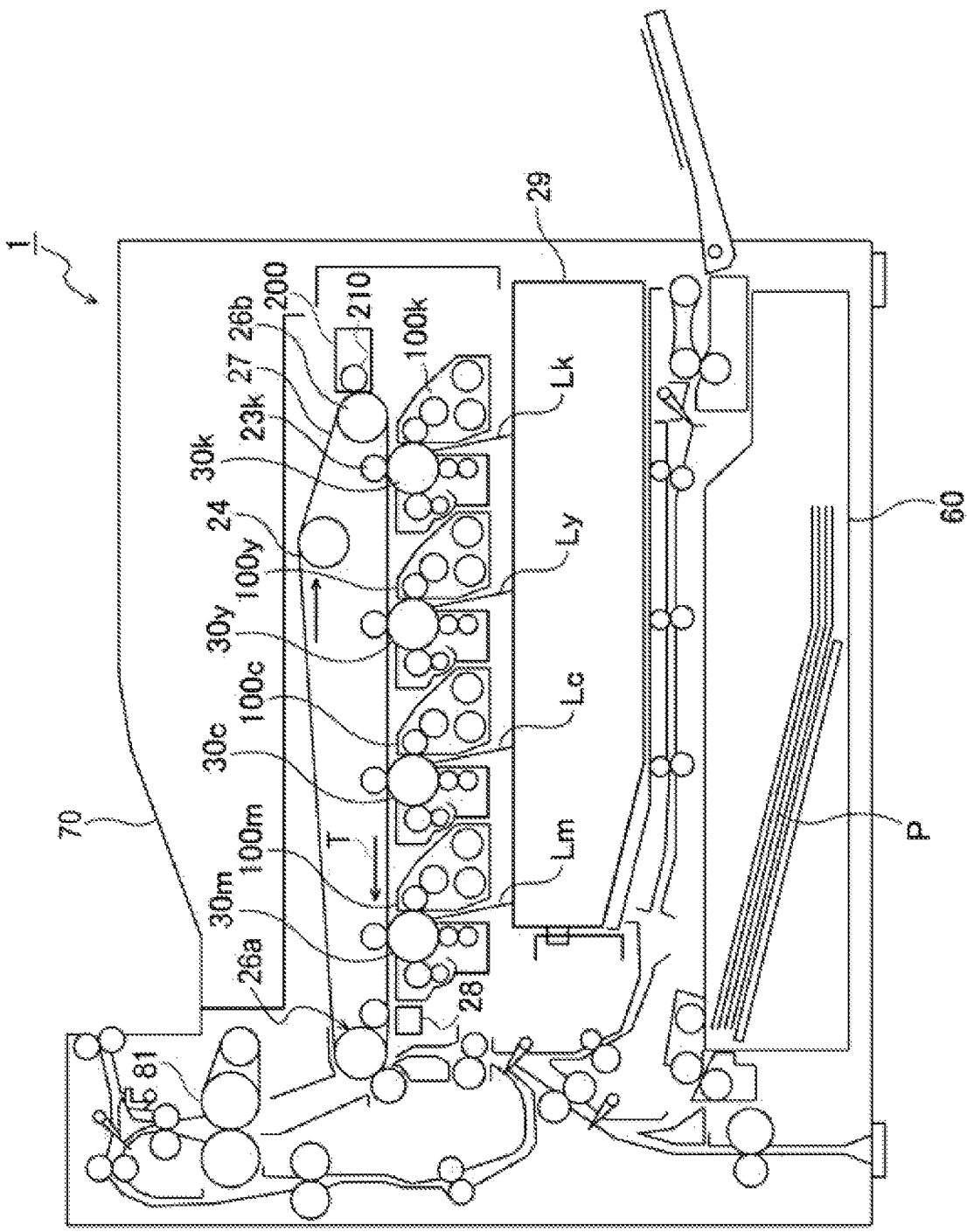
FIG. 2 shows a cross-sectional diagram that indicates a whole configuration of the image forming apparatus 1 according to the embodiment.

FIG. 2 shows a cross-sectional diagram that indicates a whole configuration of the image forming apparatus 1 according to the embodiment. The image forming apparatus 1 of this embodiment is a tandem-type color printer. In a housing 70 of the image forming apparatus 1, the photoconductor drums (image carriers) 30m, 30c, 30y, and 30k are arranged in line, corresponding to colors of Magenta, Cyan, Yellow, and Black. The development units 100m, 100c, 100y, and 100k are arranged near the photoconductor drums 30m, 30c, 30y, and 30k, respectively.

The photoconductor drums 30m, 30c, 30y, and 30k are irradiated (exposed) with laser light beams Lm, Lc, Ly, and Lk for respective colorant colors respectively by the exposure unit 29. This irradiation forms electrolatent images on the photoconductor drums 30m, 30c, 30y, and 30k. The development units 100m, 100c, 100y, and 100k agitate toner and adhere the toner onto the electrolatent images formed on surfaces of the photoconductor drums 30m, 30c, 30y, and 30k. Consequently, a development process is finished, and toner images of the respective colors are formed on the surfaces of the photoconductor drums 30m, 30c, 30y, and 30k.

The image forming apparatus 1 includes an intermediate transfer belt 27 having an endless shape. The intermediate transfer belt 27 is hitched around a driving roller 26a and a driven roller 26b. The intermediate transfer belt 27 is driven so as to rotate by the rotation of the driving roller 26a.

At an upstream position from the photoconductor drum 30k, a cleaning device 200 is arranged so as to face the driven roller 26b across the intermediate transfer belt 27. The cleaning device 200 includes a fur brush 210 that has embedded fine fibers and rotates at a high speed. The fur brush 210 can mechanically remove toner on the intermediate transfer belt 27 by scraping force at its brush tip. As mentioned, the brush cleaning manner by the fur brush 210 contacting to the intermediate transfer belt 27 is applied to the image forming apparatus 1 in order to scrape and discard residual toner.

For example, the photoconductor drum 30k and the primary transfer roller 23k nip the intermediate transfer belt 27 and the intermediate transfer belt 27 is driven so as to rotate, and thereby a Black toner image on the photoconductor drum 30k is primarily transferred to the intermediate transfer belt 27. This manner is also applied for other three colors: Cyan, Yellow, and Magenta.

Onto a surface of the intermediate transfer belt 27, the primary transfer is performed at predetermined time points corresponding to the colorant colors such that toner images of the colorant colors lay over each other, and thereby a full-color image is formed. The calibration density sensor 28 is arranged so as to be enabled to measure a density of the toner image after the primary transfer and before secondary transfer.

Afterward, the full-color image is secondarily transferred to a print sheet P supplied from a sheet feeding cassette 60, and fixed on the print sheet P with a fixing roller pair 81 in the fixing unit 80. The cleaning device 200 also removes residual toner of calibration patches from the intermediate transfer belt 27. A print medium such as the print sheet P is also called as image forming medium.

In this embodiment, it is assumed that a scanning line of the laser light beam Lm, Lc, Ly, or Lk for each colorant color with which the photoconductor drum 30m, 30c, 30y, or 30k is irradiated (exposed) has a slant from a rotation axis of the photoconductor drum 30m, 30c, 30y, or 30k within manufacture tolerance. This slant becomes apparent as a slant of an image on a print medium. Such slant of the image is too small to be found with human visual sense, but results in color registration error due to positional deviation of a toner dot of each toner color. As mentioned below, in this embodiment, the color registration error is restrained with an image process.

Figure 3:
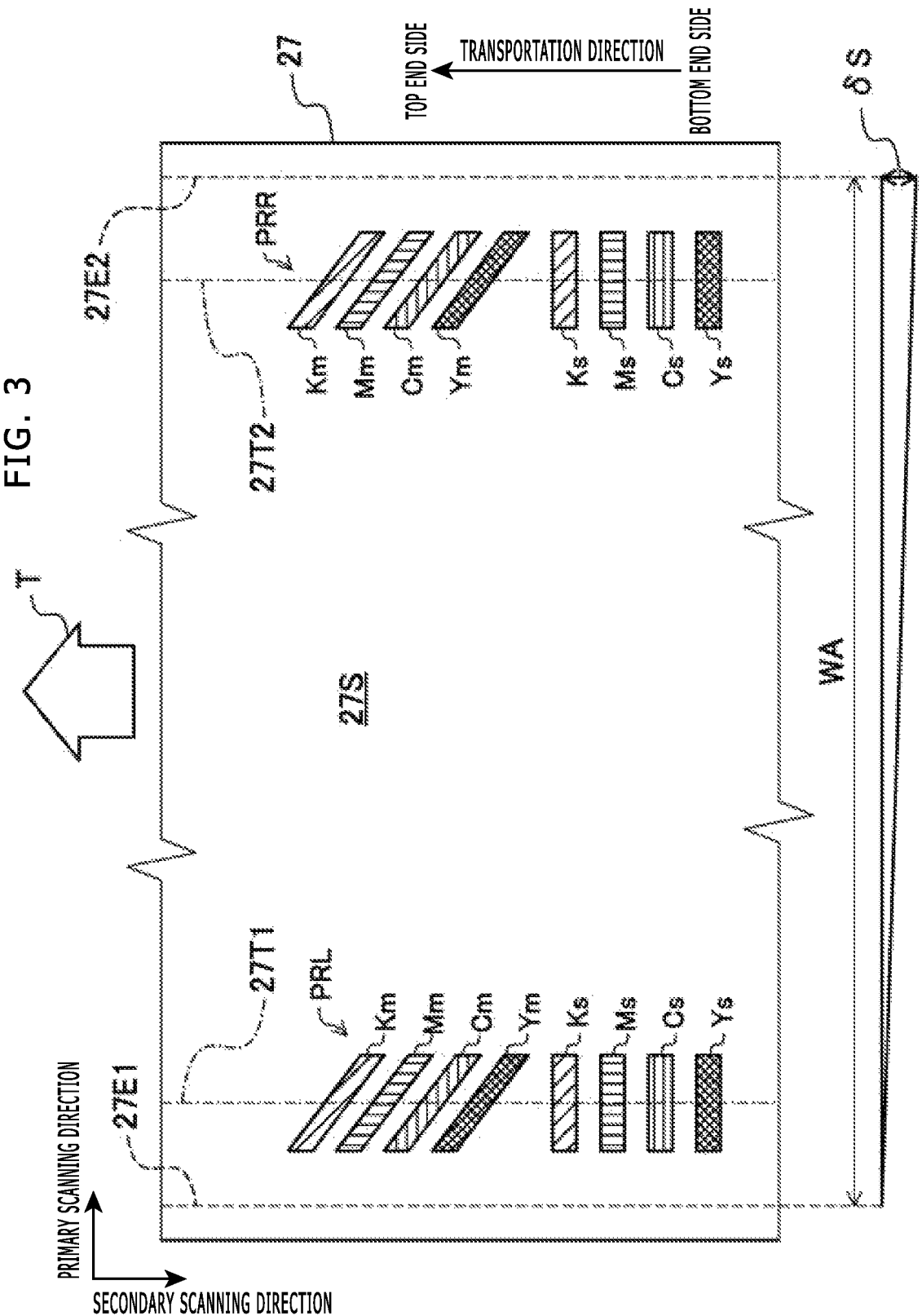
FIG. 3 shows a registration adjustment chart on a transfer surface 27S of an intermediate transfer belt 27 in the embodiment.

FIG. 3 shows a registration adjustment chart on a transfer surface 27S of an intermediate transfer belt 27 in the embodiment. On the transfer surface 27S, a belt coating layer (not shown) has been formed. The image forming apparatus 1 is configured to enable a print medium to contact the transfer surface 27S with an image forming available width WA between a first boundary 27E1 and a second boundary 27E2 and thereby enable image forming. While the print medium is transported in a driving direction T (also called as transportation direction) with contacting the transfer surface 27S, secondary transfer is performed.

On the transfer surface 27S, a pair of registration adjustment charts PRL and PRR is formed. The registration adjustment chart PRL on the left side is arranged on a center line 27T1 along the driving direction T near the first boundary 27E1 that is an end in a direction perpendicular to the driving direction T. The registration adjustment chart PRR on the right side is arranged on a center line 27T2 along the driving direction T near the second boundary 27E2 that is an end in a direction perpendicular to the driving direction T.

Each chart in the pair of the registration adjustment charts PRL and PRR is used in a registration adjustment process, and a density of the chart is measured by the calibration density sensor 28. In the registration adjustment process, the calibration processing unit 11 adjusts forming timings of toner images on the photoconductor drums 30m, 30c, 30y, and 30k such that the toner images are properly laid over each other and thereby a full-color image is formed (see FIG. 2).

The registration adjustment chart PRL on the left side is formed at predetermined timings with toner of CMYK, and includes a K primary patch Km, an M primary patch Mm, a C primary patch Cm, and a Y primary patch Ym, and a K secondary patch Ks, an M secondary patch Ms, a C secondary patch Cs, and a Y secondary patch Ys. The patches have a same unit length in the belt transportation direction. The registration adjustment chart PRR on the right side is the same as the registration adjustment chart PRL on the left side except for shifting the center line from one to the other among the center lines 27T1 and 27T2.

The K primary patch Km, the M primary patch Mm, the C primary patch Cm, and the Y primary patch Ym are patches to detect amounts of color registration error between plural images in a primary scanning direction (i.e. in a perpendicular direction to the transportation direction). The K secondary patch Ks, the M secondary patch Ms, the C secondary patch Cs, and the Y secondary patch Ys are patches to detect amounts of color registration error between plural images in a secondary scanning direction (i.e. in a parallel direction to the transportation direction).

Figure 4:
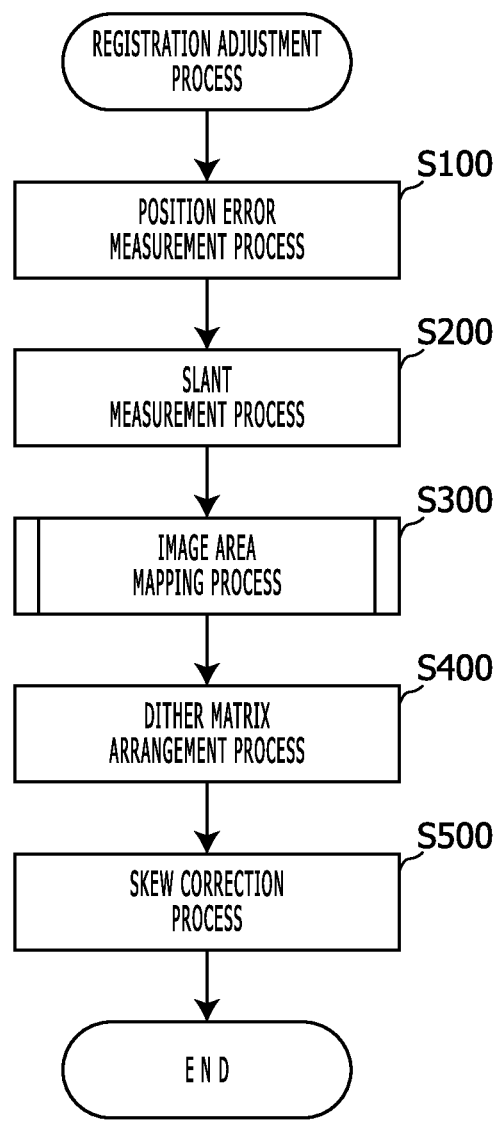
FIG. 4 shows a flowchart that indicates a registration adjustment process in the embodiment.

FIG. 4 shows a flowchart that indicates a registration adjustment process in the embodiment. The registration adjustment process in the embodiment includes adjustment to restrain (a) deviations of image forming start timings of each colorant color in the primary and secondary scanning directions, and (b) a deviation of an image of each colorant color due to a slant of a scanning line of the image.

In Step S100, the calibration processing unit 11 performs a position error measurement process. In the position error measurement process, the calibration processing unit 11 measures positional deviations of CMYK in the primary and secondary scanning directions using the pair of the registration adjustment charts PRL and PRR. The positional deviations of CMYK are measured as averages of the positional deviations measured using the pair of the registration adjustment charts PRL and PRR.

The positional deviations (i.e. color registration error amounts) in the primary scanning direction are measured as relative positional deviations of the C primary patch Cm, the M primary patch Mm, and the Y primary patch Ym from a primary scanning directional position of the K primary patch Km, when the K primary patch Km is used as a reference among the primary patches Km, Cm, Mm, and Ym formed with toner of CMYK. The positional deviations (i.e. color registration error amounts) in the secondary scanning direction are measured as relative positional deviations of the C secondary patch Cs, the M secondary patch Ms, and the Y secondary patch Ys from a secondary scanning directional position of the K secondary patch Ks, when the K secondary patch Ks is used as a reference among the secondary patches Ks, Cs, Ms, and Ys formed with toner of CMYK.

In Step S200, the calibration processing unit 11 performs a slant measurement process (also called as skew measurement process). In the slant measurement process, the calibration processing unit 11 measures a slant amount as a difference between secondary scanning directional positions measured using the pair of the registration adjustment charts PRL and PRR.

Specifically, the calibration processing unit 11 measures relative positions in the secondary scanning direction of the patches Cs, Ms, and Ys from the K secondary patch Ks on the left side using the registration adjustment chart PRL, and measures relative positions in the secondary scanning direction of the patches Cs, Ms, and Ys from the K secondary patch Ks on the right side using the registration adjustment chart PRR. Consequently, the calibration processing unit 11 substantially measures slants of primary scanning lines of the laser light beams Lm, Lc, and Ly from a primary scanning line of the laser light beam Lk.

The calibration processing unit 11 may (a) set a secondary scanning directional position of the K color as reference, (b) measure a difference of the secondary scanning directional positions on the left and right sides as pixel numbers for each color of CMY, and (c) calculate a deviation amount δS as a largest difference in the image forming available width WA; and the largest difference is obtained by performing for the measured difference multiplication by a distance between the first and second boundaries 27E1 and 27E2 and division by a distance between the center lines 27T1 and 27T2.

Specifically, if (a) a secondary scanning directional position of a scanning line of Cyan on the left side at the first boundary 27E1 advances by two pixels in the secondary scanning direction (the transportation direction T) from a secondary scanning directional position of a scanning line of K (Black) on the left side, and (b) a secondary scanning directional position of the scanning line of Cyan on the right side at the second boundary 27E2 delays by three pixels in the secondary scanning direction (the transportation direction T) from a secondary scanning directional position of the scanning line of K (Black) on the right side, then the slant appears downward to the right by five pixels (see the deviation amount 5S). Thus, the calibration processing unit 11 measures a slant of each scanning line of CMY from a scanning line of K as a reference, rather than from a direction of the rotation axis of the photoconductor drum 30*m*, 30*c*, 30*y*, or 30*k*.

Figure 5:
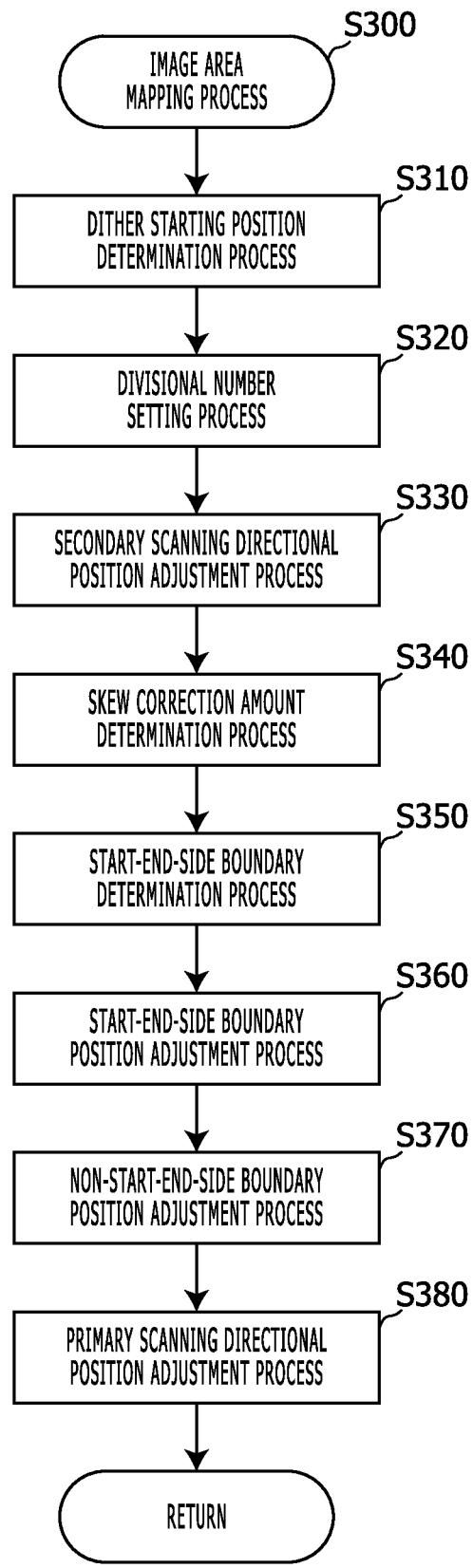
FIG. 5 shows a flowchart that indicates an image area mapping process in the embodiment.
Figure 6A:
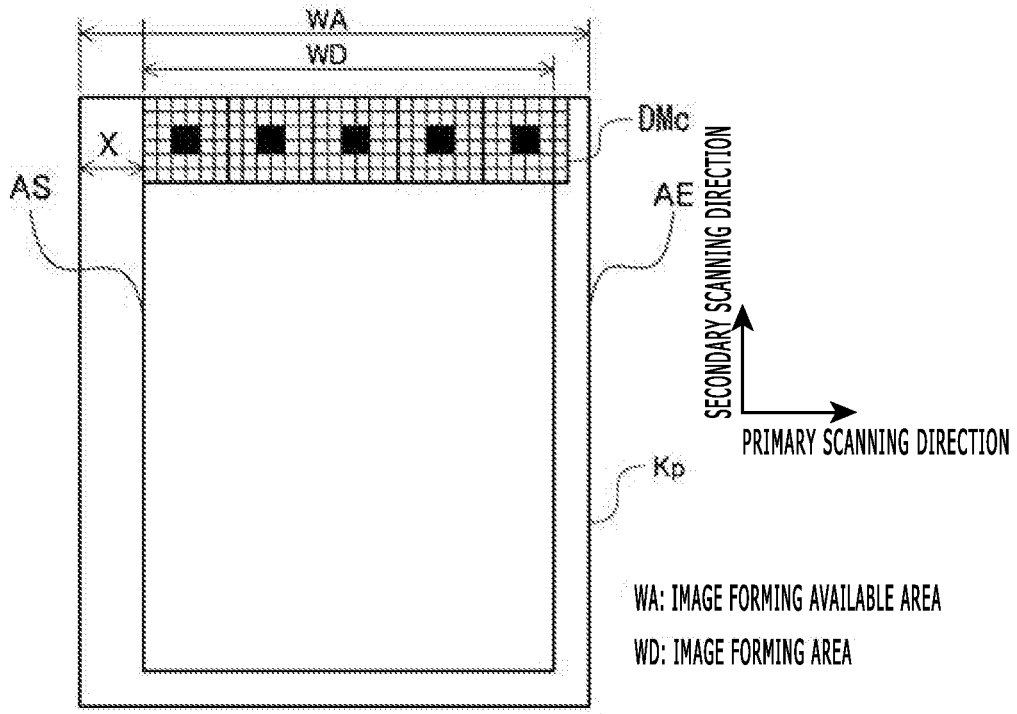
FIGS. 6A and 6B show explanation diagrams that indicate a dither starting position determination process and the registration adjustment process in the embodiment.
Figure 6B:
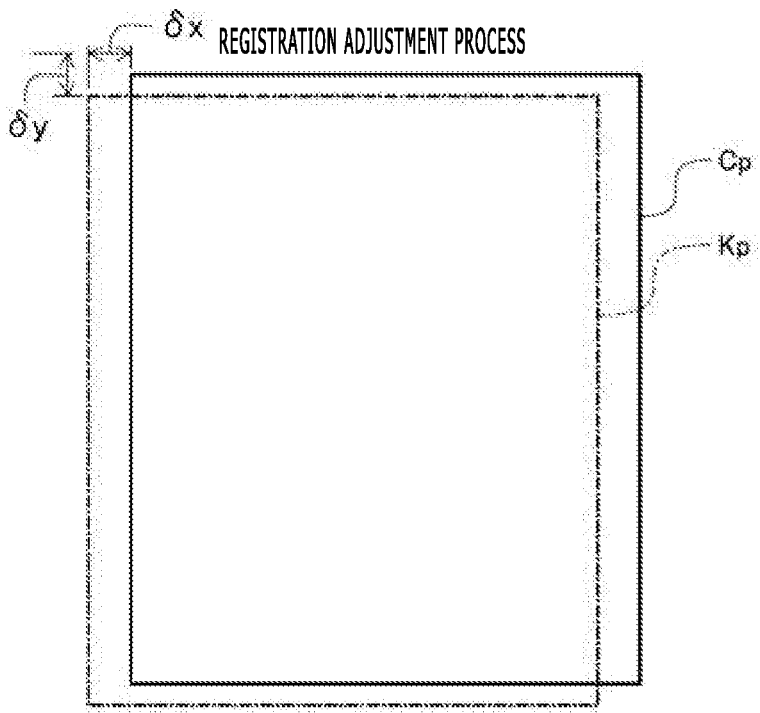

FIG. 5 shows a flowchart that indicates an image area mapping process (Step S300) in the embodiment. FIGS. 6A and 6B show explanation diagrams that indicate a dither starting position determination process and the registration adjustment process in the embodiment. The image area mapping process is a process that divides an image forming target width WD that is a width (i.e. an area) of an image forming target based on an input image for which a skew correction process is performed, and thereby sets plural image adjustment areas. The image forming target width WD is also called as image forming target area.

Therefore, the image forming apparatus 1 is enabled to perform correction with respective different amounts in the secondary scanning direction for the image adjustment areas, and to restrain the positional deviation due to the slant of the scanning line. Consequently, restrained is the deterioration of image quality due to the slant of a scanning line of the laser light beam Lm, Lc, Ly or Lk.

In this embodiment, the slant of the scanning line is defined as the deviation amount 5S in the secondary scanning direction for the image forming available width WA between the first and second boundaries 27E1 and 27E2. In this example, for simple explanation, it is assumed that a slant occurs but a curvature does not occur on the scanning line.

In Step S310, the calibration processing unit 11 performs a dither starting position determination process. In the dither starting position determination process, the calibration processing unit 11 sets a start end in the primary scanning direction of the image forming target width WD in which an image is actually formed within the image forming available width WA (see FIGS. 3 and 6A). In this example, this start end is set at a position away by a blank width X of 9 pixels from a start end of the image forming available width WA. In this example, for simple explanation, five large dither matrices DMc are arranged in the image forming target width WD.

Figure 7A:
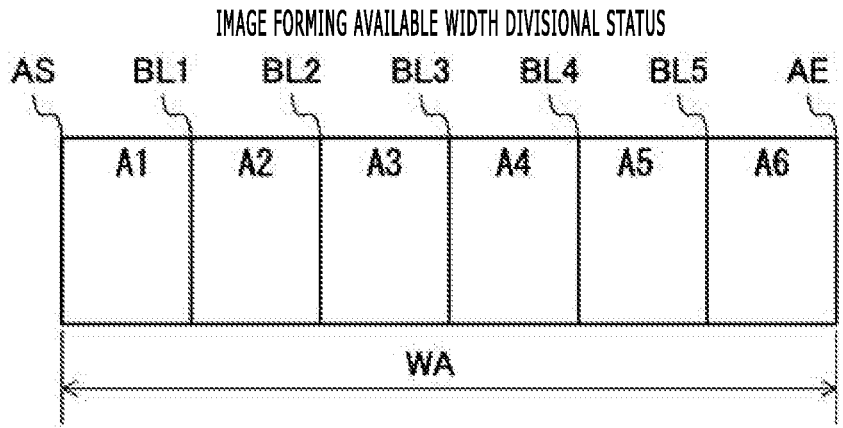
FIGS. 7A, 7B, 7C, and 7D show explanation diagrams that indicate a skew correction process and the image area mapping process.
Figure 7B:
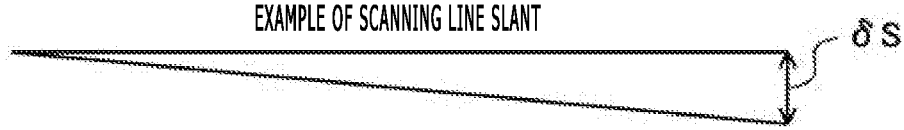
Figure 7C:
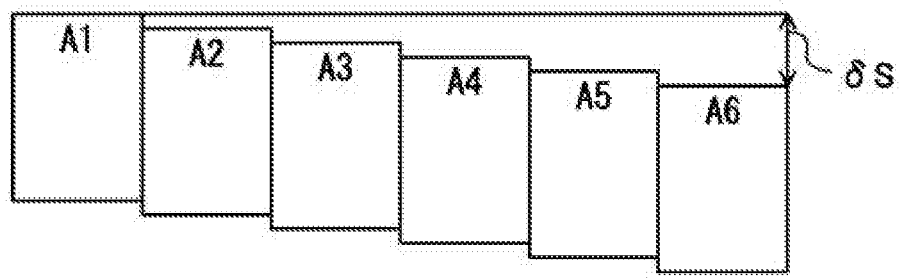

FIGS. 7A, 7B, 7C, and 7D show explanation diagrams that indicate a skew correction process and the image area mapping process. FIG. 7A shows a status in which the image forming available width WA is divided in the primary scanning direction, that is, a divisional status of the image forming available width WA. In this example, the image forming available width WA is divided into 6 areas: the first area A1 to the sixth area A6, in a range between the start end AS and a termination AE. The six areas A1 to A6 are separated at a first image boundary position BL1 to a fifth image boundary position BL5.

In Step S320, the image area dividing unit 13 performs a divisional number setting process. In the divisional number setting process, the image area dividing unit 13 sets a divisional number in the primary scanning direction on the basis of the deviation amount 5S. Specifically, the image area dividing unit 13 sets the divisional number as a large number for the large deviation amount 5S and as a small number for the small deviation amount 5S. In this example, for simple explanation, the deviation amount 5S is 5 pixels, and the image area dividing unit 13 sets the divisional number as 6 (=5 pixels+1) (see FIGS. 7A to 7C).

In Step S330, the correction processing unit 12 performs a secondary scanning directional position adjustment process. In the secondary scanning directional position adjustment process, the correction processing unit 12 sets a reference area as the third area A3 that is an area (also called as image adjustment area) corresponding to a center position of the image forming target width WD among the first to sixth areas A1 to A6, and adjusts a secondary scanning directional position of a whole C (Cyan) plane Cp by a correction amount δy from a K (Black) plane Kp (see FIG. 6B). For simple explanation, FIG. 6B shows a status in which a visible skew does not occur.

The reason why the area corresponding to a center position of the image forming target width WD, i.e. a primary scanning directional center of an image is selected as the reference is that a large distance in the primary scanning direction results in a large secondary scanning directional deviation due to a slant (skew) of a primary scanning line. In other words, the correction processing unit 12 shortens a primary scanning directional distance on both sides from the reference position in the image by setting the reference as the center position of the image forming target width WD, and thereby reduces as a whole the color registration error in the secondary scanning direction.

In Step S340, the correction processing unit 12 performs a skew correction amount determination process for each of CMY from K as a reference. In the skew correction amount determination process, the correction processing unit 12 calculates a correction amount for each image adjustment area in accordance with a primary scanning directional distance from the reference area (in this example, the third area A3) using the calibration data. In other words, the correction processing unit 13 calculates correction amounts of the 5 areas A1, A2, A4 to A6 other than the reference area (here, the area A3) among the first to sixth areas A1 to A6 on the basis of (a) a similarity using the deviation amount δS and (b) primary scanning directional distances from the reference area to the respective areas (see FIG. 7D).

In this example, the area A1 of C (Cyan) has a correction amount of −2 pixels from the reference area (the third area A3) as the calibration data (property information) (see FIG. 7D), and the area A6 of C (Cyan) has a correction amount of +3 pixels from the reference area as the calibration data. The areas A2, A4, and A5 of C (Cyan) have correction amounts of −1 pixel, +1 pixel, and +2 pixels respectively as the calibration data. The calibration data is stored in the calibration data storage area 41 in the storage unit 40.

Figure 7D:
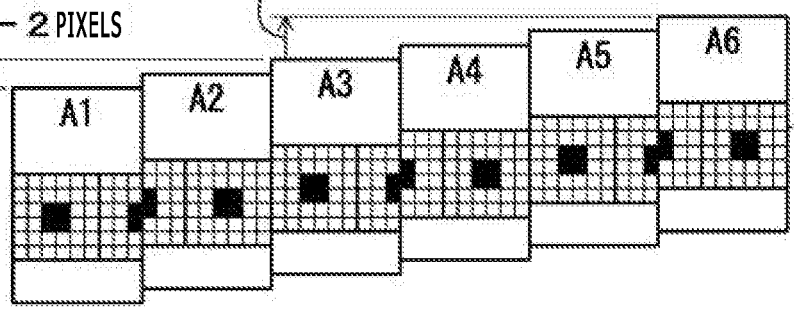

FIG. 7D shows an example of arrangement of the dither matrices DMc on the first to sixth areas A1 to A6 (see FIG. 6A). It is apparent from the arrangement example shown in FIG. 7D that a dither pattern by the dither matrices DMc is broken due to secondary scanning directional deviation of the first to sixth areas A1 to A6.

FIG. 8 shows an explanation diagram that indicates an example of a start-end-side boundary position adjustment process. In this example, for simple explanation, dither matrices DM relatively smaller than the dither matrices DMc (see FIGS. 6A and 7D) are arranged. The dither matrix DM is a square matrix of 12 elements by 12 elements (i.e. M=12).

In FIG. 8, the first to fourth areas A1 to A4 are indicated among the first to sixth areas A1 to A6. Each area of the first to fourth areas A1 to A4 has a pixel width of 50 pixels (i.e. the number of pixels N=50). The first image boundary position BL1 separates the first area A1 and the second area A2. The second image boundary position BL2 separates the second area A2 and the third area A3. The third image boundary position BL3 separates the third area A3 and the fourth area A4.

In Step S350, the image area dividing unit 13 performs a start-end-side boundary determination process. In the start-end-side boundary determination process is a process that excludes an area other than a target of the process for the dither matrices DM and thereby shrinks a computational process.

FIGS. 9A, 9B, and 9C show explanation diagrams that indicate calculation formulas used in a boundary position adjustment process in the embodiment. The calculation formula F1 is a calculation formula that determines a start-end-side boundary. The start-end-side boundary is the leftmost one among boundaries as a target of a boundary position adjustment process. The start-end-side boundary is determined on the basis of a starting position of the target (in this example, a start end in the primary scanning direction of the image forming target width WD) of a process for the dither matrices DM. In the calculation formula F1, Int (X/N) is a function that returns an integer part of a value obtained by dividing X by N.

The start end of the image forming target width WD is set at a position away by a blank width X of 9 pixels from a start end of the image forming available width WA (see FIG. 6A). According to the calculation formula F1, K0=1 (=Int (9/50)+1), and therefore the start-end-side boundary is set at the first image boundary position BL1. If the blank width X is set as 60 pixels, then K0=2 (=Int (60/50)+1), and therefore the start-end-side boundary is set at the second image boundary position BL2. Consequently, if the blank width X is set as 60 pixels, the first image boundary position BL1 is excluded from the target of the boundary position adjustment process mentioned below. As mentioned, when the blank width is large, the determination of the start-end-side boundary can exclude an unnecessary boundary from the target of the boundary position adjustment.

In Step S360, the image area dividing unit 13 performs a start-end-side boundary position adjustment process. In the start-end-side boundary position adjustment process, the image area dividing unit 13 calculates an adjustment amount for the start-end-side boundary position using the calculation formula F2. In this example, N=50, X=9, and M=12; and therefore, the image area dividing unit 13 outputs an output value of {(N−X) mod M} as 5 pixels (={(50−9) mod 12}). This value "5 pixels" is less than 6 pixels (i.e. M/2), and therefore, Y1=−{(N−X) mod M}. The image area dividing unit 13 outputs an output value Y1 as −5 pixels (=−{(50−9) mod 12}).

As mentioned, the image area dividing unit 13 can calculate the adjustment amount Y1 (−5 pixels) for the star-end-side boundary position by performing residue calculation only one time. The image area dividing unit 13 adjusts the start-end-side boundary (the first image boundary position BL1) with the adjustment amount Y1 (i.e. shifts it by 5 pixels toward the left side), and sets the start-end-side boundary at the adjusted start-end-side image boundary position BL1a. The start-end-side image boundary position BL1a agrees with a termination (also called as matrix boundary) of the third dither matrix DM from the left end. Consequently, the image area dividing unit 13 removes the broken dither pattern at the start-end-side image boundary position BL1a due to secondary scanning directional deviation of the first area A1.

In Step S370, the image area dividing unit 13 performs a boundary position adjustment process. The boundary position adjustment process is also called as non-start-end-side boundary position adjustment process, and is a process that adjusts a boundary position other than the start-end-side boundary. In the boundary position adjustment process, the image area dividing unit 13 calculates an adjustment amount for each boundary position using the calculation formula F3, that is to calculate an adjustment amount YK for a position of the K th image boundary position K.

Figure 10:
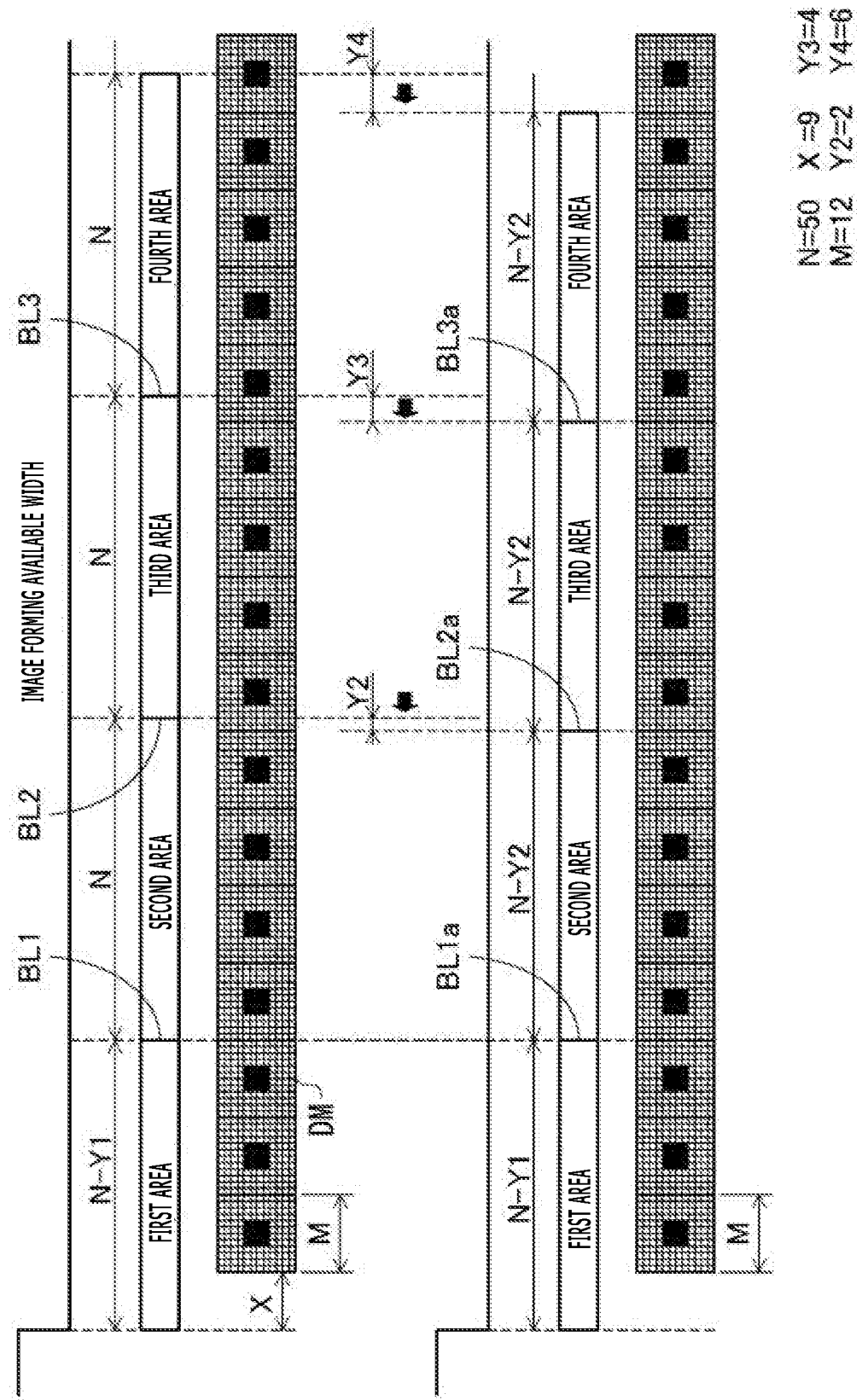
FIG. 10 shows an explanation diagram that indicates an example of the boundary position adjustment process in the embodiment.

FIG. 10 shows an explanation diagram that indicates an example of the boundary position adjustment process in the embodiment. Specifically, K=2, K0=1, N=50, and M=12 at the second image boundary position BL2; and therefore the image area dividing unit 13 outputs an output value of {((K−K0)*N) mod M} as 2 pixels (={((2−1)*50) mod 12}). This value "2 pixels" is less than 6 pixels (i.e. M/2), and therefore, Y2=−2 pixels (=−{((2−1)*50) mod 12}. The image area dividing unit 13 outputs an output value Y2 as −2 pixels.

The image area dividing unit 13 outputs an output value Y3 as −4 pixels (=−{((3−1)*50) mod 12}) because K=3, K0=1, N=50, and M=12 at the third image boundary position BL3; and outputs an output value Y4 as −6 pixels (=−{((4−1)*50) mod 12}) because K=4, K0=1, N=50, and M=12 at the fourth image boundary position BL4. Thus, the image area dividing unit 13 can adjust an image boundary position between the (K−1) th and K th image adjustment areas in a simple manner.

In Step S380, the image area dividing unit 13 performs a primary scanning directional position adjustment process. In the primary scanning directional position adjustment process, the image area dividing unit 13 reads a primary scanning directional position correction amount δx from the calibration data storage area 41 in the storage unit 40. The primary scanning directional position correction amount δx has been set for each color of CMY where K (Black) color is set as a reference.

Figure 11:
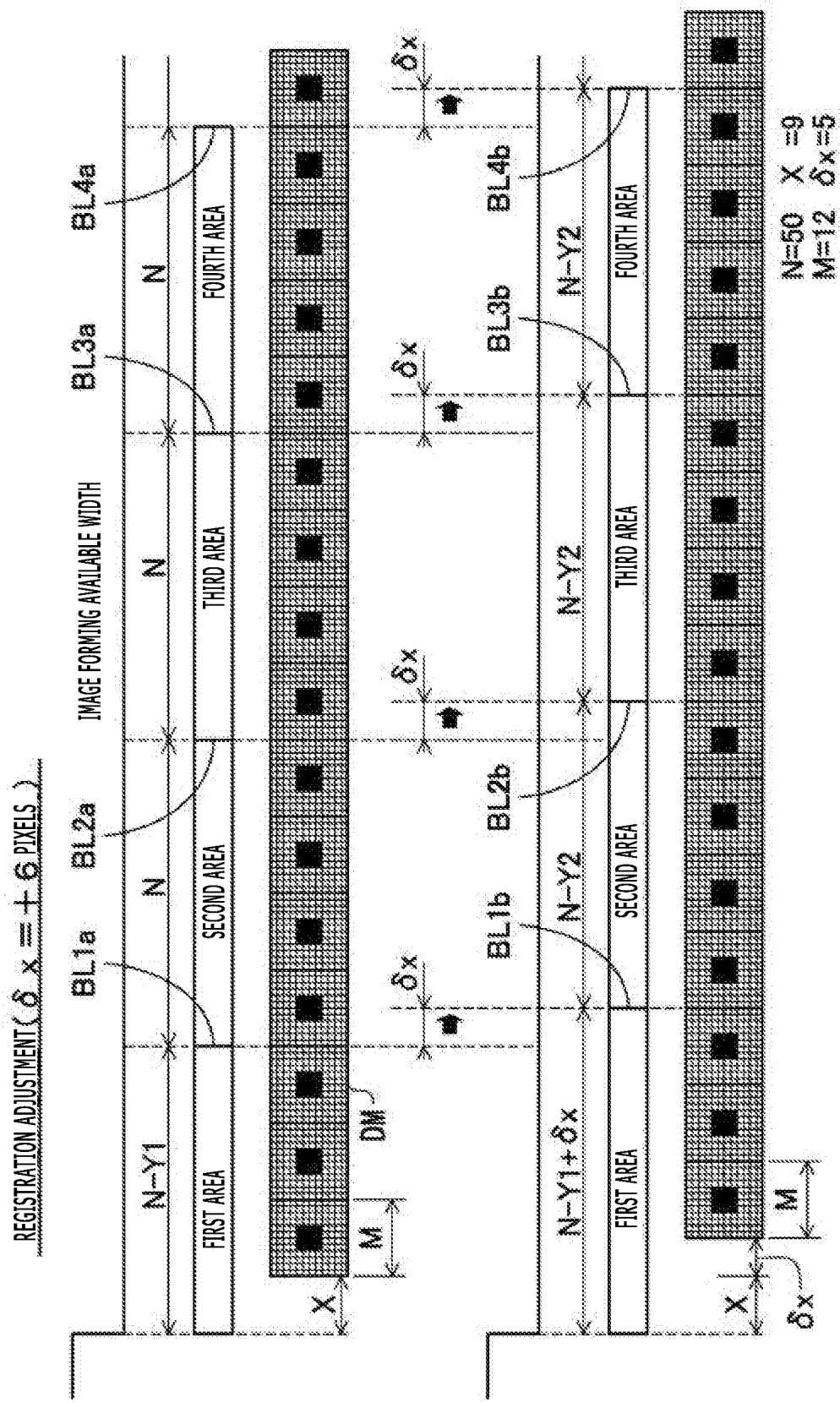
FIG. 11 shows an explanation diagram that indicates an example of a primary scanning directional position adjustment process in the embodiment.

FIG. 11 shows an explanation diagram that indicates an example of the primary scanning directional position adjustment process in the embodiment. In this example, the correction amount δx of the primary scanning directional position adjustment process is +6 pixels. The image area dividing unit 13 shifts all of the first to fifth image boundary positions BL1a to BL5a (in the figure, the first to fourth image boundary positions BL1a to BL4a are shown) by 6 pixels toward the right side and thereby changes them to the first to fifth image boundary positions BL1b to BL5b. Thus, the image area dividing unit 13 can adjust the primary scanning directional positions in a simple manner.

Figure 12:
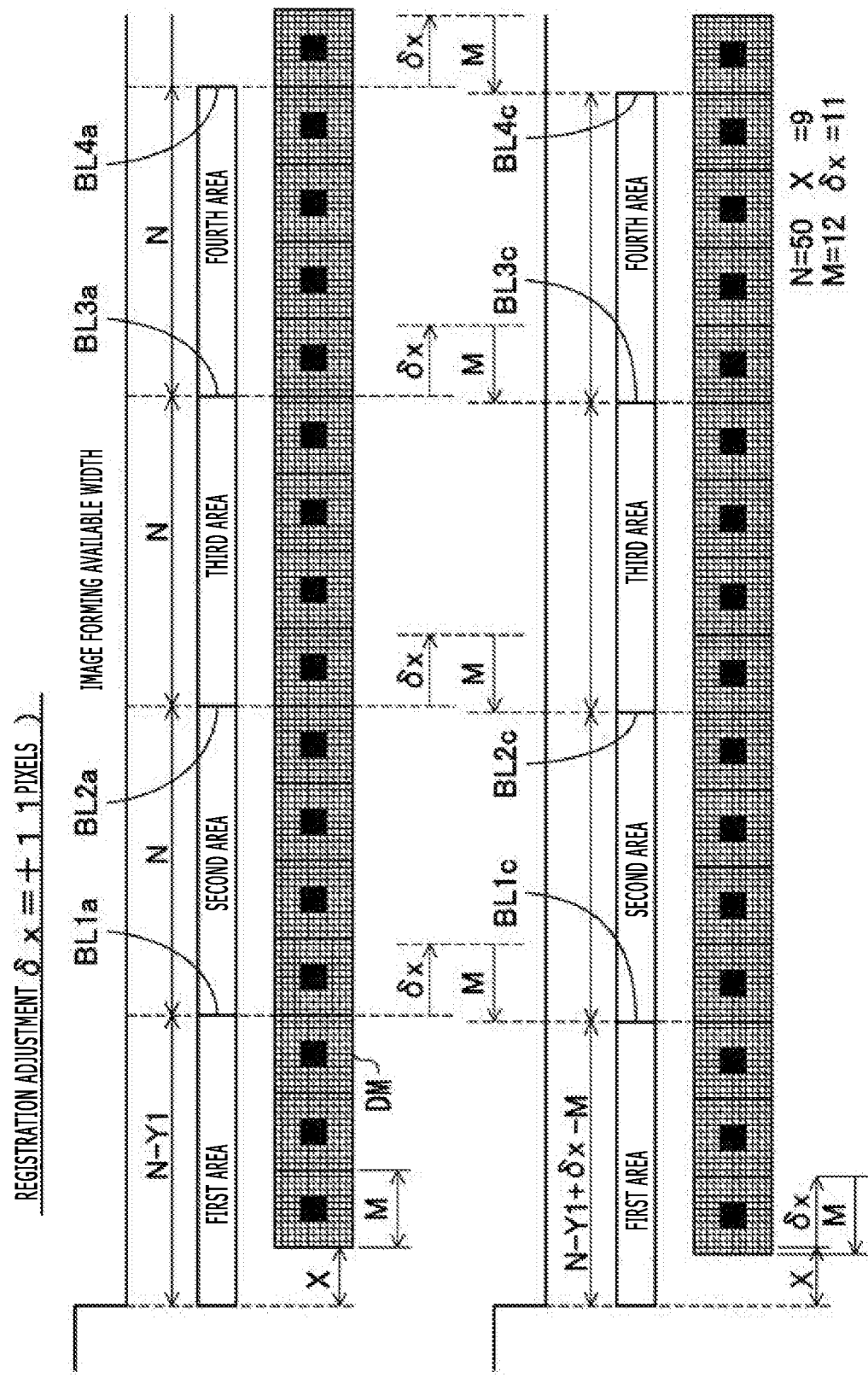
FIG. 12 shows an explanation diagram that indicates another example of a primary scanning directional position adjustment process in the embodiment.

FIG. 12 shows an explanation diagram that indicates another example of the primary scanning directional position adjustment process in the embodiment. In this example, the correction amount δx of the primary scanning directional position adjustment process is +11 pixels. The image area dividing unit 13 shifts all of the first to fifth image boundary positions BL1a to BL5a (in the figure, the first to fourth image boundary positions BL1a to BL4a are shown) by 11 pixels toward the right side and thereafter shifts all of them by the number of elements M (=12) of the dither matrix DM toward the left side, that is, in total, shifts all of them by 1 pixel toward the left side, and thereby changes them to the first to fifth image boundary positions BL1c to BL5c. Thus, the correction processing unit 12 can adjust the primary scanning directional positions in a simple manner using arrangement periodicity of the dither matrix DM, even if large positional deviation occurs in the primary scanning direction.

In this embodiment, the dither starting position determination process (Step S310) and the primary scanning directional position adjustment process (Step S380) using the blank width X are performed independently. Alternatively, these processes may not be performed independently. The primary scanning directional position adjustment process (Step S380) is performed in the dither starting position determination process (Step S310) such that the blank width X and the correction amount δx are added, and the adjustment is performed at once in a simple manner using the sum of the blank width X and the correction amount δx.

Contrarily, the aforementioned ordinary technique requires independent adjustment against a deviation of each color image due to a deviation of an image forming start timing and a slant of a scanning line. In addition, the aforementioned ordinary technique determines plural image shift candidate positions corresponding to a number based on a multiple of a primary scanning directional size of a dither matrix, and compares plural image dividing positions for a skew correction process with the candidate positions. Therefore, the aforementioned ordinary technique calculates the candidate positions and the image dividing positions, stores them in a memory, and performs the comparison between them, and consequently, requires large computation amount and the memory.

Meanwhile, image forming apparatuses are getting high image resolution, and a large number of dither matrices are arranged in the image forming available area. Therefore, since it is predicted that larger hardware resource is required in the future, it is favorable to reduce the required larger hardware resource as mentioned in this embodiment.

In Step S400 (see FIG. 4), the halftone processing unit 22 performs a dither matrix arrangement process. In the dither matrix arrangement process, the halftone processing unit 22 arranges the dither matrices DM in the image forming target width WD. Consequently, even though the adjustment is performed of secondary scanning directional position of each image adjustment area, the halftone processing unit 22 can perform a halftone process of the image data without breaking a dither pattern of the dither matrices DM.

In Step S500, the correction processing unit 12 performs skew correction. In the skew correction, the correction processing unit 12 adjusts a secondary scanning directional position of each image adjustment area other than the reference area (in this example, the third area A3) using the correction amount calculated for each image adjustment area so as to get the secondary scanning directional position close to a secondary scanning directional position of the reference area.

As mentioned, the image forming apparatus 1 in the embodiment performs the adjustment process in a simple manner and thereby restrains the deterioration of image quality due to a slant of a scanning line, and consequently, can reduce hardware resource required for the process.

The present disclosure is embodied as not only the aforementioned embodiment but the following variation.

In the aforementioned embodiment, image deterioration due to the slant of the scanning line is restrained by the adjustment process in the secondary scanning direction for each of the image adjustment areas. In addition, curvature of the scanning line may be measured, for example, using the registration adjustment chart that includes three or more rows of the patch groups. In such a case, the curvature of the scanning line is restrained by the adjustment process in the secondary scanning direction for each of the image adjustment areas as well as the restrainment of image deterioration due to the slant of the scanning line.

What is claimed is:

1. An image forming apparatus that forms an image on an image forming medium on the basis of input image data using colorant of plural colors, comprising:

a halftone processing unit configured to perform a halftone process for the input image data using plural dither matrices;

a calibration processing unit configured to generate calibration data to calculate an amount of a color registration error corresponding to a primary scanning directional position of an image forming available width with regard to an image formed with the colorant of the plural colors;

an image area dividing unit configured to (a) determine (a1) plural matrix boundaries as boundaries of plural dither matrices arranged in an image forming target area in the image forming available width and (a2) an image boundary position that is identical to any of the plural matrix boundaries, and (b) divide the image forming target area with the determined image boundary position in the primary scanning direction and thereby set plural image adjustment areas; and a correction processing unit configured to (a) calculate correction amounts for the plural image adjustment areas using the calibration data in accordance with primary scanning directional positions of the plural image adjustment areas respectively, and (b) correct secondary scanning directional positions of the plural image adjustment areas using the calculated correction amounts respectively and thereby restrain the color registration error;

wherein the image area dividing unit determines the image boundary position using a remainder left by dividing the number of pixels consisting of a width of the image adjustment area by the number of pixels in the primary scanning direction of the dither matrix.

2. The image forming apparatus according to claim 1 wherein the image area dividing unit (a) sets among the image adjustment areas the K0 th to the K th image adjustment areas where K0 is an integer equal to or larger than 1 and K is an integer equal to or larger than 2, and (b1) if a value of (((K−K0)*N) mod M) is equal to or less than (M/2), adjusts the image boundary position using a value of (−(((K−K0)*N) mod M)) and (b2) if a value of (((K−K0)*N) mod M) is larger than (M/2), adjusts the image boundary position between the (K−1) th image adjustment area and the K th image adjustment area using a value of (M−(((K−K0)*N) mod M));

the K0 th image adjustment area is an image adjustment area on which a dither matrix for a start end is arranged among the plural dither matrices;

N is the number of pixels in the primary scanning direction of the image adjustment area before the adjustment; and M is the number of pixels in the primary scanning direction of the dither matrix.

3. The image forming apparatus according to claim 1 wherein the image area dividing unit sets the image boundary position between the K0 th image adjustment area and the (K0+1) th image adjustment area using the number of pixels in a width of a blank between a start end of the image forming available width and a start end of the image forming target area.

4. The image forming apparatus according to claim 1 wherein the correction processing unit (a) sets a reference area as the image adjustment area that includes a primary scanning directional center position of the image forming target area, (b) adjusts all of secondary scanning directional positions of the plural image adjustment areas on the basis of the reference area, and (c) determines respective correction amounts of the plural image adjustment areas in accordance with primary scanning directional distances from the reference area.

5. An image forming method that forms an image on an image forming medium on the basis of input image data using colorant of plural colors, comprising:
   a halftone processing step performing a halftone process for the input image data using plural dither matrices;
   a calibration processing step generating calibration data to calculate an amount of a color registration error corresponding to a primary scanning directional position of an image forming available width with regard to an image formed with the colorant of the plural colors;
   an image area dividing step (a) determining (a1) plural matrix boundaries as boundaries of plural dither matrices arranged in an image forming target area in the image forming available width and (a2) an image boundary position that is identical to any of the plural matrix boundaries, and (b) dividing the image forming target area with the determined image boundary position in the primary scanning direction and thereby setting plural image adjustment areas; and
   a correction processing step (a) calculating correction amounts for the plural image adjustment areas using the calibration data in accordance with primary scanning directional positions of the plural image adjustment areas respectively, and (b) correcting secondary scanning directional positions of the plural image adjustment areas using the calculated correction amounts respectively and thereby restraining the color registration error;
   wherein the image area dividing step comprises a step determining the image boundary position using a remainder left by dividing the number of pixels consisting of a width of the image adjustment area by the number of pixels in the primary scanning direction of the dither matrix.

6. A non-transitory computer readable recording medium storing an image forming program to control an image forming apparatus that forms an image on an image forming medium on the basis of input image data using colorant of plural colors, wherein the image forming program causes the image forming apparatus to act as:
   a halftone processing unit configured to perform a halftone process for the input image data using plural dither matrices;
   a calibration processing unit configured to generate calibration data to calculate an amount of a color registration error corresponding to a primary scanning directional position of an image forming available width with regard to an image formed with the colorant of the plural colors;
   an image area dividing unit configured to (a) determine (a1) plural matrix boundaries as boundaries of plural dither matrices arranged in an image forming target area in the image forming available width and (a2) an image boundary position that is identical to any of the plural matrix boundaries, and (b) divide the image forming target area with the determined image boundary position in the primary scanning direction and thereby set plural image adjustment areas; and
   a correction processing unit configured to (a) calculate correction amounts for the plural image adjustment areas using the calibration data in accordance with primary scanning directional positions of the plural image adjustment areas respectively, and (b) correct secondary scanning directional positions of the plural image adjustment areas using the calculated correction amounts respectively and thereby restrain the color registration error;
   wherein the image area dividing unit determines the image boundary position using a remainder left by dividing the number of pixels consisting of a width of the image adjustment area by the number of pixels in the primary scanning direction of the dither matrix.

* * * * *